United States Patent
Thantharate et al.

(10) Patent No.: US 11,910,253 B1
(45) Date of Patent: *Feb. 20, 2024

(54) USE OF SECONDARY RADIO TO AVOID MEASUREMENT GAP ON PRIMARY AIR INTERFACE CONNECTION

(71) Applicant: T-Mobile USA, Inc., Bellevue, WA (US)

(72) Inventors: Anurag Thantharate, Overland Park, KS (US); Sougata Saha, Overland Park, KS (US); Sreekar Marupaduga, Overland Park, KS (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/659,380

(22) Filed: Apr. 15, 2022

Related U.S. Application Data

(63) Continuation of application No. 16/947,976, filed on Aug. 26, 2020, now Pat. No. 11,343,732.

(51) Int. Cl.
| | |
|---|---|
| *H04W 36/00* | (2009.01) |
| *H04W 48/16* | (2009.01) |
| *H04W 24/10* | (2009.01) |
| H04W 88/06 | (2009.01) |
| H04W 76/16 | (2018.01) |
| H04W 92/10 | (2009.01) |
| H04W 36/28 | (2009.01) |

(52) U.S. Cl.
CPC ..... *H04W 36/00837* (2018.08); *H04W 24/10* (2013.01); *H04W 36/0058* (2018.08); *H04W 36/0069* (2018.08); *H04W 36/0072* (2013.01); *H04W 48/16* (2013.01); *H04W 36/0088* (2013.01); *H04W 36/28* (2013.01); *H04W 76/16* (2018.02); *H04W 88/06* (2013.01); *H04W 92/10* (2013.01)

(58) Field of Classification Search
CPC . H04W 24/10; H04W 36/0088; H04W 88/06; H04W 36/0085; H04W 36/14; H04W 36/08; H04W 36/30; H04W 40/12
See application file for complete search history.

(56) References Cited

U.S. PATENT DOCUMENTS

| | | | |
|---|---|---|---|
| 9,900,845 | B2 | 2/2018 | Cui et al. |
| 2011/0242999 | A1 | 10/2011 | Palanki et al. |
| 2020/0015246 | A1 | 1/2020 | Vilaipornsawai et al. |
| 2020/0313991 | A1 | 10/2020 | Li et al. |
| 2021/0007033 | A1 | 1/2021 | Tada et al. |
| 2023/0067324 | A1* | 3/2023 | Teyeb ............... H04W 24/10 |

* cited by examiner

*Primary Examiner* — Nam T Huynh
(74) *Attorney, Agent, or Firm* — Lee & Hayes P.C.

(57) ABSTRACT

When a first radio of a UE has an air-interface connection with an access node on a first carrier and the UE encounters a trigger for the UE to scan for and report to the access node coverage on a second carrier, a second radio of the UE, rather than the first radio of the UE, will conduct the scanning, and the first radio of the UE will then report to access node over the air-interface connection on the first carrier a result of the scanning conducted by the second radio. Optimally, the first radio of the UE thus need not tune away from its air-interface connection with the access node in order for the UE to scan for target coverage on the second carrier. And the process could thereby help avoid the interruption of communication between the UE and the access node on the air-interface connection over the first carrier.

15 Claims, 2 Drawing Sheets

USE OF SECONDARY RADIO TO AVOID MEASUREMENT GAP ON PRIMARY AIR INTERFACE CONNECTION

REFERENCE TO RELATED APPLICATION

This is a continuation of U.S. patent application Ser. No. 16/947,976, filed Aug. 26, 2020, the entirety of which is hereby incorporated by reference.

BACKGROUND

A cellular wireless communication system typically includes a number of access nodes that are configured to provide wireless coverage areas in which user equipment devices (UEs) such as cell phones, tablet computers, machine-type-communication devices, tracking devices, embedded wireless modules, and/or other wirelessly equipped communication devices (whether or not user operated) can operate. Each access node could be coupled with a core network that provides connectivity with various application servers and/or transport networks, such as the public switched telephone network (PSTN) and/or the Internet for instance. With this arrangement, a UE within coverage of the system could engage in air interface communication with an access node and could thereby communicate via the access node with various application servers and other entities.

Such a system could operate in accordance with a particular radio access technology (RAT), with communications from the access nodes to UEs defining a downlink or forward link and communications from the UEs to the access nodes defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And recently, the industry has completed initial specifications for "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each access node could operate on one or more radio-frequency (RF) carriers, each of which could be frequency division duplex (FDD), defining separate frequency channels for downlink and uplink communication, or time division duplex (TDD), with a single frequency channel multiplexed over time between downlink and uplink use. Each such carrier could be defined within an industry standard frequency band, by its frequency channel(s) being defined within the frequency band. Examples of such frequency bands include (i) bands 2, 4, 12, 25, 26, 66, 71, and 85, supporting FDD carriers (ii) band 41, supporting TDD carriers, and (iii) bands n258, n260, and n261, supporting FDD and TDD carriers, among numerous other possibilities.

On the downlink and uplink, an access node's air interface on such a carrier could be configured in a specific manner to define physical resources for carrying information, such as user-plane data and control-plane signaling, wirelessly between the access node and UEs.

In a non-limiting example implementation, for instance, the air interface could be divided over time into frames, subframes, and symbol time segments, and over frequency into subcarriers that could be modulated to carry data. The example air interface could thus define an array of time-frequency resource elements, with each resource element spanning a respective symbol time segment and occupying a respective subcarrier, and the subcarrier of each resource element could be modulated to carry information.

In addition, certain groups of these resource elements on the downlink and uplink of the example air interface could then be designated for special use.

For instance, on the downlink, a range of resource elements per subframe could be generally reserved to define a physical downlink control channel (PDCCH) for carrying control signaling such as scheduling directives from the access node to served UEs, and another range of resource elements per subframe could be generally reserved to define a physical downlink shared channel (PDSCH) in which the resource elements could be grouped to define physical resource blocks (PRBs) that could be allocated on an as needed basis to carry data communication from the access node to UEs. Further, within these generally reserved ranges, certain resource elements could be excluded from the PDCCH and PDSCH and reserved for other use, such as to carry reference signals or synchronization signals that UEs could detect as an indication of the presence of coverage and can measure to gauge coverage strength, among other possibilities.

And likewise, on the uplink, certain resource elements could be reserved to define an uplink control channel (PUCCH), and other resource elements between could be generally reserved to define a physical uplink shared channel (PUSCH) in which the resource elements could be grouped to define PRBs that could be allocated on an as needed basis to carry data communications from UEs to the access node. And within these generally reserved ranges, certain resource elements could similarly be excluded from the PUCCH and PUSCH and reserved for other use, such as to carry uplink reference signals and random-access messaging, among other possibilities.

OVERVIEW

When a UE enters into coverage of an example network, the UE could detect threshold strong coverage of an access node on a particular carrier. For instance, the UE could be equipped with a radio and associated RF circuitry (e.g., one or more RF filters), which the UE could use to sequentially tune to each of various predefined carriers in search of coverage that is at least as strong as a predefined threshold. Upon finding such coverage, the UE could then engage in random-access and connection signaling, such as Radio Resource Control (RRC) signaling, with the access node to establish an air-interface connection (e.g., RRC connection) through which the access node will then serve the UE on that carrier.

Further, if the UE is not already registered for service with the core network, the UE could transmit to the access node an attach request, which the access node could forward to a core-network controller for processing. And the core-network controller and access node could then coordinate setup for the UE of one or more user-plane bearers, each including (i) an access-bearer portion that extends between the access node and a core-network gateway that provides connectivity with a transport network and (i) a data-radio-bearer portion that extends over the air between the access node and the UE.

Once the UE is so connected and registered, the access node could then serve the UE in a connected mode over the air-interface connection, managing downlink air-interface communication of packet data to the UE and uplink air-interface communication of packet data from the UE. For instance, when the core-network gateway receives user-plane data for transmission to the UE, the data could flow to the access node, and the access node could then transmit the data on allocated downlink PRBs to the UE. And when the UE has user-plane data for transmission on the transport network, the UE could transmit the data on allocated uplink PRBs to the access node.

When a UE is connected with and served by an access node on a particular carrier, the UE may at times need to tune away from its connection with the access node on that carrier to scan for other target coverage (provided by the same or another access node) on another carrier.

For instance, if and when the UE detects that coverage from its serving access node on the particular carrier becomes threshold weak, the UE may report that fact to the access node, and the access node may then direct the UE to scan for target coverage on one or more other carriers, to facilitate possible inter-frequency handover. The UE may then responsively tune its wireless communication interface away from the UE's serving carrier, respectively to each of the one or more indicated other carriers, and scan for coverage on each such other carrier. And if the UE thereby finds target coverage on another such carrier, the UE may report that fact to the UE's serving access node, and the serving access node may responsively coordinate handover of the UE from being connected on the UE's current serving carrier to being connected instead on the other carrier.

Unfortunately, a technical problem with this tuneaway process is that it could interrupt the UE's communication with its serving access node. For instance, when the UE tunes away to scan for coverage on one or more other carriers, the UE may be tuned away from its connection on its serving carrier for a tuneaway period (or "measurement gap") established by default and/or specified by the access node. And during that tuneaway period, communications between the UE and the access node may be paused.

This interruption of communication between the UE and its serving access node could be especially problematic for particular types of communications, such as ultra-reliable low-latency communications (URLLC) for instance. For these or other types of communications as to which the tuneaway period would be problematic, it would be desirable to minimize or avoid the tuneaway.

The present disclosure provides a mechanism to help address this issue in a scenario where a UE includes multiple radios each with associated respective RF circuitry. A representative UE, for instance, could be equipped with two such radios and associated RF circuitry, to facilitate dual-connectivity service, wherein one radio would be connected with and served by a first access node according to a first RAT while the other radio would be connected with and served concurrently by a second access node according to a second RAT.

In accordance with the disclosure, when a first radio of a UE has a first air-interface connection with an access node on a first carrier and the UE encounters a trigger for the UE to scan for and report coverage on a second carrier different than the first carrier, a second radio of the UE, rather than the first radio of the UE, will conduct the scanning, and the first radio of the UE will then report to access node over the first air-interface connection on the first carrier a result of the scanning conducted by the second radio. Optimally, the first radio of the UE thus need not tune away from its first air-interface connection with the access node in order for the UE to scan for target coverage on the second carrier. And the process could thereby help avoid the above-noted interruption of communication between the UE and the access node on the first air-interface connection.

Considering that this process could be especially useful where the UE's communication on the first air-interface connection is interruption-sensitive, the process could further take into account the UE's type of communication on the first air-interface connection. For instance, the process could additionally include determining that the UE's type of communication on the first air-interface connection is interruption-sensitive and, in response to the determination, then responding to the trigger by having the second radio rather than the first radio conduct the scanning for coverage on the second carrier.

This process could be applied in a situation where, of the UE's first and second radios, only the first radio has an existing air-interface connection—e.g., where the second radio is not connected, perhaps being in an idle mode or the like. In that case, the UE can readily make use of the second radio without concern for an impact that having the second radio scan for coverage on the second carrier may have to any ongoing air-interface communications to/from the second radio.

Alternatively, the process could be applied in a situation where the UE's second radio has an existing second air-interface connection with another access node, in which case the second radio may tune away from that second connection to conduct the scanning. Although carrying out the process in that context may work best if the second radio has just a best-efforts connection with the other access node or otherwise where tuning away from the second air-interface connection would not be unduly problematic.

These as well as other aspects, advantages, and alternatives will become apparent to those reading the following description, with reference where appropriate to the accompanying drawings. Further, it should be understood that the discussion in this overview and elsewhere in this document is provided by way of example only and that numerous variations are possible.

DETAILED DESCRIPTION

Figure 1:
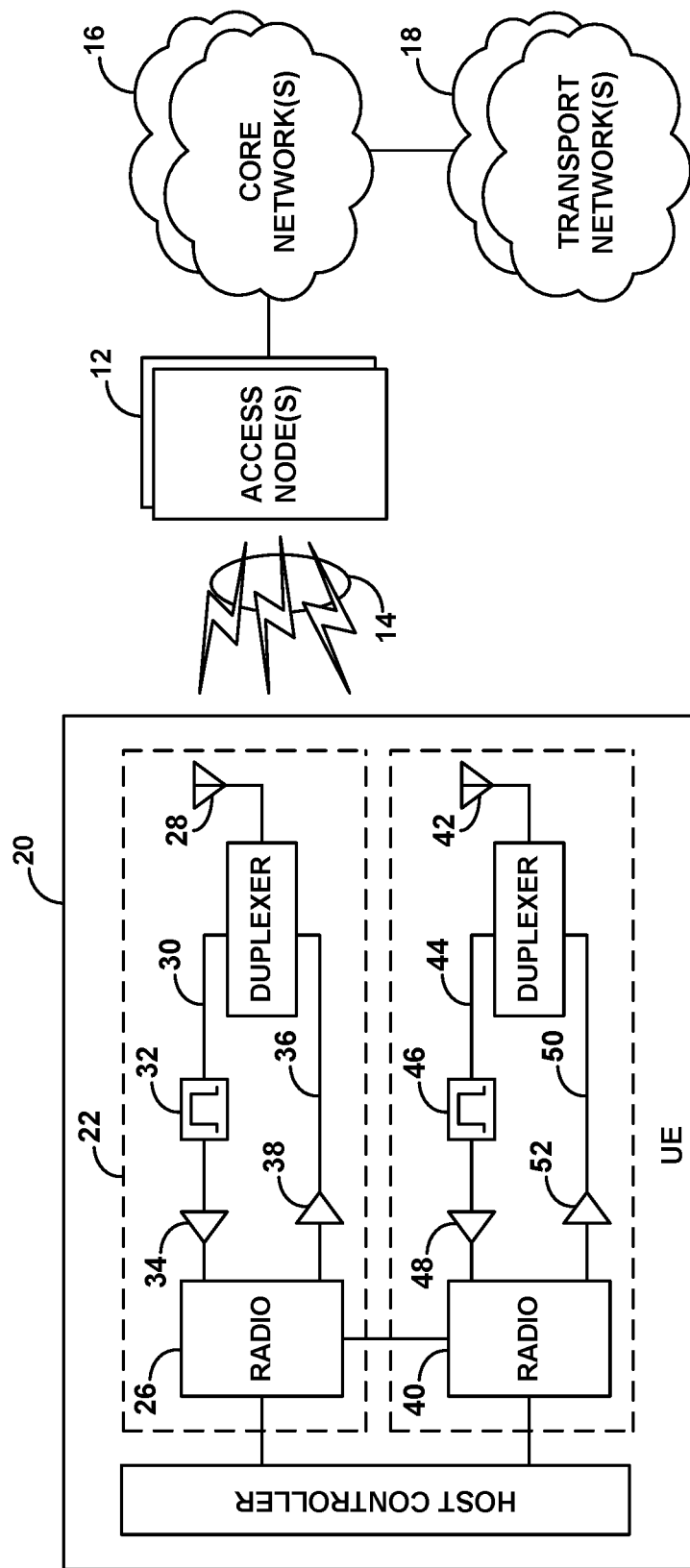
FIG. 1 is a simplified block diagram of an example wireless communication system in which features of the present disclosure can be implemented.

Referring to the drawings, FIG. 1 is a simplified block diagram of an example wireless communication system in which the disclosed principles could be implemented. It should be understood, however, that the disclosed principles could extend to apply with respect to other arrangements as well. Further, it should be understood that other variations from the specific arrangements and processes described are possible. For instance, various entities, connections, functions, and other elements could be added, omitted, distributed, re-located, re-ordered, combined, or changed in other ways. In addition, various operations described as being performed by one or more entities could be implemented in various ways, such as by a processing unit executing instructions stored in non-transitory data storage, along with associated circuitry or other hardware, among other possibilities.

The example system of FIG. 1 includes multiple access nodes 12 arranged to provide coverage and service on multiple different carriers 14. For instance, each access node might provide coverage and service respectively on a different one of the carriers, some of the access nodes might provide coverage and service on the same carriers as each other, and one or more of the access nodes might provide coverage and service on more than one of the multiple carriers. Each such carrier could be FDD or TDD and could be defined in a standard frequency band, such as one of the bands noted above, among other possibilities.

Further, the coverage and service provided by these access nodes 12 could be configured according to one or more RATs. For instance, some of the access nodes might provide coverage and service according to a first RAT, and others of the access nodes might provide coverage and service according to a second RAT. Without limitation, for example, each of one or more of the access nodes might be 4G LTE access nodes (evolved Node-Bs (eNBs)) providing 4G coverage and service, and one or more other of the access nodes might be 5G NR access nodes (e.g., next generation Node-Bs (gNBs)).

Each of these access nodes 12 could be a macro access node of the type configured to provide a wide range of coverage or could take other forms, such as a small cell access node, a repeater, a femtocell access node, or the like, which might be configured to provide a smaller range of coverage, among other possibilities. Further, the coverage and service provided by each access node could be according to a respective RAT. And two or more of the access nodes 12 could be collocated with each other and provide coverage in largely the same direction as each other, to define an area in which UEs can communicate concurrently with and possibly be served by multiple access nodes at once.

The air interface on each carrier 14 could also be configured as noted above to define various air-interface resources for carrying communications between the access node and UEs. For example, in the time domain, the air interface could define a continuum of 10-millisecond (ms) frames, each divided into ten 1-ms subframes, and each subframe could be further divided into a number of timeslots, each additionally divided into symbol time segments. And in the frequency domain, the carrier bandwidth could be divided into subcarriers with specified subcarrier spacing on the order of 15 to 240 kHz. With this example arrangement, the air interface could define the array of resource elements as noted above, with each resource element each spanning a respective symbol time segment and occupying a respective subcarrier, and the access node and UEs could communicate with each other through modulation of the subcarriers to carry data in those resource elements. Further, as noted above, particular sets of resource elements on the air interface could be reserved for specific purposes.

This carrier-structure and/or service per carrier could vary based on RAT. For instance, 4G and 5G air-interfaces could differ from each other in various ways now known or later developed, such as with one implementing variable subcarrier spacing and the other having fixed subcarrier spacing, with one having flexible TDD configuration and the other having fixed TDD configuration, with one having different subcarrier spacing and/or symbol time segment length than the other, and/or with one making different use of MIMO technologies than the other, among other possibilities.

As additionally shown without limitation, the access nodes 12 in the example network are connected with at least one core network 16 that provides connectivity with at least one transport network 18. An example core network could include a user-plane subsystem (not shown), such as a Serving Gateway (SGW) and Packet Data Network Gateway (PGW), or a User Plane Function (UPF), that provide connectivity with a transport network such as the Internet. Further, the example core network could include a control-plane subsystem (not shown), such as a Mobility Management Entity (MME), or Access and Mobility Management Function (AMF) and Session Management Function (SMF), which could be responsible for managing bearer setup and other operations.

Shown within coverage of the example access nodes is then a representative UE 20, which could be any of the types of UEs noted above, among other possibilities.

As illustrated, the example UE 20 includes at least two RF chains 22, 24, each including a respective radio and antenna structure and a respective downlink branch including associated RF circuitry such as a filter and a low-noise amplifier (LNA) and a respective uplink branch including associated RF circuitry such as a power amplifier (PA). Namely, RF chain 22 is shown including a radio 26 and antenna structure 28, and a downlink branch 30 having a filter 32 and an LNA 34 and an uplink branch 36 having a PA 38. And RF chain 24 is shown including a radio 40 and an antenna structure 42, and a downlink branch 44 having a filter 46 and an LNA 48 and an uplink branch 50 having a PA 52.

In one implementation, one of these RF chains could be configured generally to allow operation according to one RAT and the other RF chain could be configured generally to allow operation according to another RAT. For instance, RF chain 22, including radio 26, could be configured by default to support 4G LTE operation, and RF chain 24, including radio 40, could be configured by default to support 5G NR operation. However, each RF chain might also be capable of other operations.

Further, while these example RF chains are shown as separate blocks in the figure, portions of the RF chains could alternatively be integrated together. For instance, the radios, filters, and amplifiers of both RF chains could be provided on a single integrated chipset or the like. And the two RF chains could share a some components, such as an antenna structure for instance.

In an example implementation, the radio respectively of each RF chain could govern RF communication according to an applicable RAT, including modulating baseband signals for RF transmission and demodulating RF signals to recover baseband signals for processing by the UE. Further, the radio could control other aspects of its respective RF chain, such as by setting a filter passband and LNA and PA gains, among other possibilities. To facilitate these and other functions, the radio of each RF chain, or the radios cooperatively, could include a controller, such as a processing unit (e.g., microprocessor) programmed with instructions to carry out associated operations.

As further shown in the figure, the radios 26, 40 of the two illustrated RF chains could be connected by a logical or physical signaling path to facilitate signaling communication between the radios—which could help facilitate the presently disclosed operations among other functions. For instance, this signaling path could enable one radio to inform the other radio when the other radio should scan for coverage on one or more carriers, and could enable the other radio to report the results of such scanning to the first radio, to help avoid the need for the first radio itself to tune away as noted above.

Further, the example UE 20 is shown including a host controller 54, which could likewise comprise a processing unit (e.g., microprocessor) programmed with instructions to carry out various operations. In an example implementation, the host controller 54 of the UE 20 could govern general operation of the UE, including application-layer functions. For instance, the host controller 54 could execute application logic to facilitate user-interface interaction and to establish and engage in communication sessions with various application servers and other remote entities, interacting with and making use of either or both RF chains 22, 24, through associated signaling paths, to facilitate wireless data communication.

With the arrangement of FIG. 1, when the UE 20 enters into coverage of the example system, the UE could use RF chain 22, including radio 26, to initially search for threshold strong coverage on which to connect. And upon detecting the strongest such coverage of a carrier on a first carrier, radio 26 could then engage in a process to establish an air-interface connection with the access node on the first carrier and to attach with a core network.

For instance, the radio 26 could engage in random-access signaling and RRC connection signaling with the access node on the first carrier to establish an RRC connection with the access node on the first carrier. Further, the radio 26 could then transmit an attach request over the RRC connection to the access node, which the access node could forward to a core-network controller (e.g., MME or AMF). And after authenticating the UE, the core-network controller could then engage in signaling to set up for the UE one or more user-plane bearers Once the UE is so connected and attached, the access node could then serve the UE over the UE's connection on the first carrier. For instance, when the access node has data to transmit to the UE, the access node could transmit the data on allocated downlink PRBs of the first carrier to the radio 26, for receipt and processing by the UE. And when the UE has data to transmit, the radio 26 could transmit the data on allocated uplink PRBs of the first carrier to the access node.

Furthermore, the UE might support dual-connectivity in which the UE uses RF chain 22 and RF chain 24 to be served concurrently over two air-interface connections, possibly each with a different respective access node, one being a master node (MN) of the dual connectivity and the other being a secondary node (SN) of the dual connectivity. For instance, if RF chain 22 is generally configured for 4G LTE communication and RF chain 24 is generally configured for 5G NR communication as noted above, the UE might support EN-DC service, in which radio 26 is served by a 4G eNB as MN over a 4G connection while radio 40 is served concurrently by a 5G gNB as SN over a 5G connection.

In an example implementation, the access node with which the UE initially connects could be the MN and could coordinate setup of this dual connectivity for the UE, such as by engaging in signaling with the UE and the SN to set up a secondary connection between the UE and the SN. For instance, the access node serving radio 26 could signal to radio 26 to indicate that the secondary connection is being configured, and radio 26 could responsively signal to radio 40, to cause radio 40 to complete setup of the secondary connection with the SN. Radio 40 could then engage in random-access signaling with the SN to establish the secondary connection between radio 40 and the SN. And once that secondary connection is established, the UE could then be served concurrently (i) over its primary connection between the MN and radio 26 and (ii) over its secondary connection between the SN and radio 40, each in the manner discussed above for instance.

When the UE, through radio 26, is served by an access node over a connection on the first carrier, regardless of whether the UE is also served concurrently by another access node over another connection, the UE may engage in various types of communication on its connection over the first carrier. Further, the host controller 54 and radio 26 could be aware of the type of communication in which the UE engages over the first carrier, which could be a type of communication in which the UE is currently engaged and/or a type of communication in which the UE is likely to engage. For instance, this information could stem from factors such as bearer type(s) currently established for the UE, communication-setup signaling in which the UE has engaged, and what type of device the UE is, among other possibilities.

These types of communication could differ from each other in terms of their respective levels of interruption sensitivity, defining the extent to which interrupting or temporarily blocking the communication would be problematic. By way of example, best-efforts communications such as web browsing or other general Internet communications may not be very interruption sensitive. Whereas, real-time media communications such a voice or streaming video communications, or ultra-reliable low-latency communications (URLLC) such as public safety, remote diagnosis/surgery, emergency response, autonomous driving, industrial automation, and others may be especially interruption sensitive.

Further, in line with the discussion above, when the UE, through radio 26, is served over the first carrier by the access node, the UE may at times need to scan for alternate coverage on one or more second carriers different than the first carrier.

In practice, for instance, when radio 26 first connects with the access node over the first carrier, the access node may transmit to the radio 26 on the first carrier a measurement object that directs the radio to report to the access node when the UE's reference signal receive power (RSRP) from the access node on the first carrier is at least as low as a specified threshold level. While served by the access node on the first carrier, the radio 26 may therefore regularly monitor RSRP from the access node on the first carrier and, upon detecting that the RSRP is threshold low, may transmit a measurement report over the first carrier to the access node, informing the access node that RSRP is threshold low. And in response to this measurement report, the access node may then transmit to the radio 26 on the first carrier a new measurement object that directs the radio 26 to report to the access node if and when the UE's RSRP of coverage on any of one or more specified second carriers is at least as high as a specified threshold level (possibly a threshold delta higher than the UE's RSRP from the access node on the first carrier). Thus, in response to this new measurement object, the UE may need to scan for coverage on the one or more specified second carriers.

Having radio 26 tune to each of the one or more specified second carriers to measure coverage strength, however, may require radio 26 to tune away from its connection with the access node on the first carrier. And as noted above, this measurement gap could be problematic, especially if the UE engages in particularly interruption-sensitive communication through communication with the access node over the first carrier.

In accordance with the present disclosure as noted above, rather than having radio 26 tune away from its connection with the access node on the first carrier to scan for coverage on the one or more second carriers, the UE could make use of radio 40 to scan for the coverage on the one or more second carriers. For instance, when radio 26 receives over the first carrier from the access node the measurement object directing the radio 26 to report to the access node if and when the access is within threshold strong coverage of any of the one or more second carriers, radio 26 could responsively signal to radio 40 to cause radio 40 to conduct the scanning and to report back to radio 26.

In an example implementation, radio 26 could forward the second-carrier measurement object to radio 40 to cause radio 40 to scan according to the measurement object and to report to radio 26 upon detecting that RSRP on one of the indicated one or more second carriers is at least as high as the threshold level indicated by the measurement object. Alternatively, radio 26 could more generally signal to radio 40 to scan for and report any coverage that radio 40 detects on any of the one or more specified second carriers.

In response to this signaling from radio 26, radio 40 could thus tune to each of the specified one or more carriers in search of coverage and, upon detecting such coverage per second carrier, could measure RSRP and report the results to radio 26.

Optimally, if radio 26 operates according to a specific RAT, radio 40 could scan for coverage and measure RSRP in accordance with that RAT. For instance, if radio 26 operates according to 4G LTE, even if radio 40 normally operates according to 5G NR, radio 40 could conduct the scanning and measuring according to 4G LTE—such as by scanning each carrier for predefined 4G LTE synchronization signaling and, upon detecting coverage on a given second carrier, evaluating strength of predefined 4G LTE reference signaling on that carrier. Once radio 40 reports back to the radio 26 the results of the scanning by radio 40, radio 26 could then transmit to its serving access node over the first carrier a measurement report if applicable. For instance, if radio 40 detects and reports to radio 26 threshold strong coverage on a given second carrier, radio 26 could transmit to the access node a measurement report indicating that the UE is within threshold strong coverage on that given second carrier. The access node could then take responsive action, such as processing handover of the UE to the second carrier for instance.

As noted above, this process could be carried out conditional on the UE engaging in especially interruption-sensitive communication over the connection of radio 26 on the first carrier. To facilitate application of this condition, the host controller 54 and/or radio 26 could determine when the UE is engaged in a type of commination that is threshold interruption sensitive, such as one of the especially interruption-sensitive communications noted above for instance. And in response, when radio 26 encounters a trigger for scanning for coverage on one or more second carriers, the radio 26 could arrange for radio 40 to carry out the scanning, to help avoid a measurement gap that would interrupt the communication of radio 26 on the first carrier.

Figure 2:
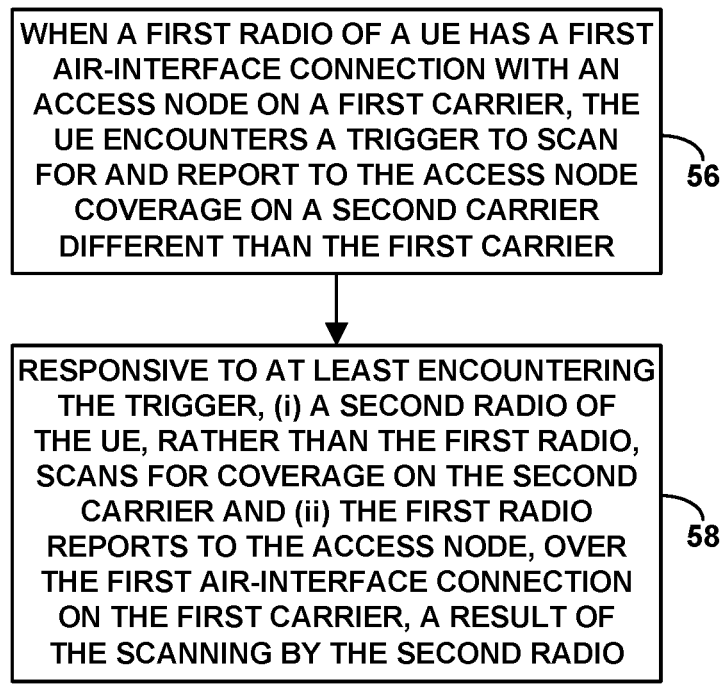
FIG. 2 is a flow chart depicting an example method in accordance with the present disclosure.

FIG. 2 is a flow chart depicting a method that could be carried out in accordance with the present disclosure, to facilitate inter-frequency scanning by a UE that includes multiple radios including a first radio and a second radio. As shown in FIG. 2, at block 56, the method includes, when the first radio of the UE has a first air-interface connection with an access node on a first carrier, the UE encountering a trigger to scan for and report to the access node coverage on a second carrier different than the first carrier. And at block 58, the method includes, responsive to at least encountering the trigger, (i) the second radio, rather than the first radio, scanning for coverage on the second carrier and (ii) the first radio reporting to the access node, over the first air-interface connection on the first carrier, a result of the scanning by the second radio.

As discussed above, having the second radio, rather than the first radio, conduct the scanning for coverage on the second carrier could help to avoid having an associated measurement gap interrupt service of the first radio on the first carrier.

In line with the discussion above, the act of encountering the trigger to scan for and report to the access node coverage on the second carrier could involve the first radio receiving from the access node a measurement object that directs the first radio to report to the access node if and when the UE is within threshold strong coverage on the second carrier.

Further, the act of the scanning by the second radio, rather than by the first radio, for coverage on the second carrier, responsive to at least encountering the trigger could involve, responsive to at least encountering the trigger, signaling to the second radio to cause the second radio to conduct the scanning. And the method could additionally include the second radio reporting to the first radio the result of the scanning by the second radio, to facilitate the first radio's reporting over to the access node, over the first air-interface connection on the first carrier, the result of the scanning by the second radio.

In addition, as discussed above, having the second radio rather than the first radio conduct the scanning could be further responsive to a determination that the first radio engages in a particular type of communication over the first air-interface connection on the first carrier. For instance, the it could be further responsive to a determination that the first radio engages in interruption-sensitive air-interface communication (e.g., URLLC) over the first air-interface connection on the first carrier.

Still further, as noted above, the method could be carried out in a scenario where the second radio has a second air-interface connection for dual-connectivity service (e.g., while the first radio has the first air-interface connection and the second radio has the second air-interface connection). Or the method could be carried out in a scenario where the second radio does not have such a second air-interface connection.

And as additionally discussed above, first and second radios could operate according to different respective RATs. Namely, the first radio could generally operate according to a first RAT, and the second radio could generally operate according to a second RAT. And in that case, the second radio may conduct the scanning according to the first RAT—to facilitate searching for target coverage that could be used by the first radio.

In line with the discussion above, a UE that implements this method could thus include a first radio that supports air-interface communication with a wireless communication system, and a second radio that also supports air-interface communication with the wireless communication system. In such a UE, the first radio could be configured to receive from an access node, when the first radio has a first air-interface connection with the access node on a first carrier, a directive for the first radio to report to the access node the UE being within coverage of a second carrier different than the first carrier. Further, the first radio could be configured to respond to the directive by signaling to the second radio to cause the second radio, rather than the first radio, to conduct scanning for the coverage of the second carrier. And the first radio could be configured to then report over the first carrier to the access node a result of the scanning by the second radio.

Various features described above could be implemented in this context as well, and vice versa.

The present disclosure also contemplates at least one non-transitory computer readable medium having stored thereon (e.g., being encoded with) program instructions executable by at least one processing unit to carry out various operations described above.

Exemplary embodiments have been described above. Those skilled in the art will understand, however, that changes and modifications may be made to these embodiments without departing from the true scope and spirit of the invention.

What is claimed is:

1. A method for inter-frequency scanning by a user equipment device (UE) that includes multiple radios including at least a first radio and a second radio, the method comprising:
   when the first radio of the UE has a first air-interface connection with an access node on a first carrier and the first radio is engaging in interruption-sensitive air-interface communication over the first air-interface connection on the first carrier, (a) encountering by the UE a trigger to scan for and report to the access node coverage on a second carrier different than the first carrier, and (b) responsive to at least encountering the trigger and to the first radio engaging in the interruption-sensitive air-interface communication over the first air-interface connection on the first carrier, (i) scanning by the second radio, rather than by the first radio, for coverage on the second carrier, and (ii) reporting by the first radio to the access node, over the air-interface connection on the first carrier, a result of the scanning by the second radio,
   wherein the first radio operates according to a first radio access technology (RAT) and the second radio operates according to a second RAT different than the first RAT, and
   whereby scanning by the second radio, rather than the first radio, for coverage on the second carrier helps to avoid a measurement gap interrupting service of the first radio on the first carrier.

2. The method of claim 1, wherein encountering the trigger to scan for and report to the access node coverage on the second carrier comprises the first radio receiving from the access node a measurement object that directs the first radio to report to the access node if and when the UE is within threshold strong coverage on the second carrier.

3. The method of claim 1, wherein the scanning by the second radio, rather than by the first radio, for coverage on the second carrier, responsive to at least encountering the trigger and to the first radio engaging in the interruption-sensitive air-interface communication over the first air-interface connection on the first carrier comprises:
   responsive to at least encountering the trigger and to the first radio engaging in the interruption-sensitive air-interface communication over the first air-interface connection on the first carrier, signaling to the second radio to cause the second radio to conduct the scanning.

4. The method of claim 3, further comprising reporting from the second radio to the first radio the result of the scanning by the second radio, to facilitate the reporting by the first radio to the access node, over the first air-interface connection on the first carrier, the result of the scanning by the second radio.

5. The method of claim 1, wherein the interruption-sensitive air-interface communication comprises ultra-reliable low-latency communication (URLLC).

6. The method of claim 1, wherein the method is carried out while the second radio has a second air-interface connection for dual-connectivity service.

7. The method of claim 1, wherein the method is carried out while the second radio does not have a second air-interface connection for dual-connectivity service.

8. The method of claim 1, wherein the first RAT is one of 4G LTE and 5G NR, and the second RAT is the other of 4G LTE and 5G NR.

9. A user equipment device (UE) comprising:
   a first radio supporting air-interface communication with a wireless communication system, wherein the first radio operates according to a first radio access technology (RAT);
   a second radio supporting air-interface communication with the wireless communication system, wherein the second radio operates according to a second RAT different than the first RAT,
   wherein the first radio is configured to carry out operations when the first radio has a first air-interface connection with an access node on a first carrier and the first radio is engaging in interruptive-sensitive air-interface communication over the first air-interface connection on the first carrier, the operations including (a) receiving from the access node a directive for the first radio to report to the access node the UE being within coverage of a second carrier different than the first carrier, and (b) responsive to the directive and to the first radio engaging in the interruptive-sensitive air-interface communication over the first air-interface connection on the first carrier, signaling to the second radio to cause the second radio, rather than the first radio, to conduct scanning for the coverage of the second carrier, and
   and wherein the first radio is configured to report over the first carrier to the access node a result of the scanning by the second radio,
   whereby scanning by the second radio, rather than the first radio, for coverage on the second carrier helps to avoid a measurement gap interrupting service of the first radio on the first carrier.

10. The UE of claim 9, wherein receiving by the first radio from the access node the directive for the first radio to report to the access node the UE being within coverage of the second carrier comprises receiving by the first radio from the access node a measurement object that directs the first radio to report to the access node if and when the UE is within threshold strong coverage on the second carrier.

11. The UE of claim 9, wherein the second radio is configured to report to the first radio the result of the scanning by the second radio, to facilitate the reporting by the first radio over the first carrier to the access node the result of the scanning by the second radio.

12. The UE of claim 9, wherein the interruption-sensitive air-interface communication comprises ultra-reliable low-latency communication (URLLC).

13. The UE of claim 9, wherein the scanning by the second radio for the coverage of the second carrier occurs while the second radio has a second air-interface connection for dual-connectivity service.

14. The UE of claim 9, wherein the scanning by the second radio for the coverage of the second carrier occurs while the second radio does not have a second air-interface connection for dual-connectivity service.

15. The UE of claim 9, wherein the first RAT is one of 4G LTE and NR, and the second RAT is the other of 4G LTE and 5G NR.

\* \* \* \* \*